(12) United States Patent
Bracken et al.

(10) Patent No.: US 10,320,570 B2
(45) Date of Patent: Jun. 11, 2019

(54) DIGITAL SECURITY CERTIFICATE SELECTION AND DISTRIBUTION

(71) Applicant: Microsoft Technology Licensing, LLC, Redmond, WA (US)

(72) Inventors: Quentin Cleveland Bracken, Issaquah, WA (US); Dawn Murphy Lamb, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 130 days.

(21) Appl. No.: 15/251,129

(22) Filed: Aug. 30, 2016

(65) Prior Publication Data

US 2018/0062855 A1  Mar. 1, 2018

(51) Int. Cl.
*H04L 9/32* (2006.01)
*H04L 9/00* (2006.01)
*H04L 9/14* (2006.01)
*H04L 9/30* (2006.01)
*H04L 29/06* (2006.01)
*H04L 9/08* (2006.01)

(52) U.S. Cl.
CPC ............ *H04L 9/3263* (2013.01); *H04L 9/006* (2013.01); *H04L 9/083* (2013.01); *H04L 9/14* (2013.01); *H04L 9/30* (2013.01); *H04L 9/3268* (2013.01); *H04L 63/06* (2013.01); *H04L 63/0823* (2013.01); *H04L 63/0853* (2013.01); *H04L 63/062* (2013.01)

(58) Field of Classification Search
CPC ... H04L 9/006; H04L 9/14; H04L 9/30; H04L 63/06; H04L 63/0853; H04L 9/3263
See application file for complete search history.

(56) References Cited

U.S. PATENT DOCUMENTS

| 6,134,658 | A  | 10/2000 | Multerer et al. |
| 6,308,277 | B1 | 10/2001 | Vaeth et al.    |
| 6,430,688 | B1 | 8/2002  | Kohl et al.     |
| 7,568,095 | B2 | 7/2009  | Thornton et al. |

(Continued)

FOREIGN PATENT DOCUMENTS

WO    2011068738 A2    6/2011

OTHER PUBLICATIONS

Young Jung et al., "A survey of security issue in multi-agent systems," 2012, pp. 239-260. (Year: 2012).*

(Continued)

*Primary Examiner* — Luu T Pham
*Assistant Examiner* — Canh Le

(57) ABSTRACT

Systems, apparatuses, services, platforms, and methods are discussed herein that provide digital security services and enhance digital security certificate issuance for communication systems. In one example, a digital security platform is presented that includes a client interface service configured to receive requests for digital security certificates from one or more requesting entities. The digital security platform includes a certificate service configured to process the requests against evaluation criteria to select certificate authorities to handle the requests, and handler processes configured to interface with associated ones of the selected certificate authorities for issuance and delivery of the digital security certificates.

17 Claims, 5 Drawing Sheets

(56) References Cited

U.S. PATENT DOCUMENTS

| | | | |
|---|---|---|---|
| 8,010,786 B1* | 8/2011 | Ward | H04L 63/20 |
| | | | 713/156 |
| 8,028,162 B2 | 9/2011 | Beattie et al. | |
| 8,086,848 B2 | 12/2011 | Thayer et al. | |
| 8,719,574 B2 | 5/2014 | Relyea | |
| 8,850,208 B1 | 9/2014 | Parkinson | |
| 9,032,204 B2 | 5/2015 | Byrd et al. | |
| 2002/0073311 A1 | 6/2002 | Futamura et al. | |
| 2003/0165241 A1* | 9/2003 | Fransdonk | G06Q 20/12 |
| | | | 380/258 |
| 2004/0177246 A1 | 9/2004 | Balaz et al. | |
| 2005/0120205 A1 | 6/2005 | Umezawa et al. | |
| 2006/0129804 A1* | 6/2006 | Satkunanathan | G06F 21/33 |
| | | | 713/156 |
| 2008/0201575 A1 | 8/2008 | van der Rijn | |
| 2010/0138907 A1 | 6/2010 | Grajek et al. | |
| 2011/0154024 A1* | 6/2011 | Ignaci | H04L 63/0823 |
| | | | 713/156 |
| 2013/0318221 A1* | 11/2013 | Anaya | G06F 9/505 |
| | | | 709/223 |
| 2014/0337616 A1* | 11/2014 | Kimberly | G06F 21/57 |
| | | | 713/156 |
| 2017/0171172 A1* | 6/2017 | Sullivan | H04L 63/061 |
| 2017/0214717 A1* | 7/2017 | Bush | H04L 63/107 |

OTHER PUBLICATIONS

M. Agni Catur Bhakti et al., "EAP Authentication Mechanism for Ad Hoc Wireless LAN," 2008, pp. 13-40. (Year: 2008).*

"Managed PKI for Your Organization", Published on: Sep. 11, 2015 Available at: https://www.entrust.com/products/cloud/pki/.

"International Search Report and Written Opinion Issued in PCT Application No. PCT/US2017/049322", dated Nov. 9, 2017, 11 Pages.

* cited by examiner

DIGITAL SECURITY CERTIFICATE SELECTION AND DISTRIBUTION

BACKGROUND

Computer networking systems, such as packet networks linking various endpoints, can include security features to ensure that endpoints communicate over secure links. These secure links can reduce eavesdropping and other forms of malicious attacks by employing encryption over the links. Some forms of encryption include symmetric or asymmetric encryption techniques, such as the popular public key infrastructure (PKI) employed in many networked systems. However, when exchanging information to establish the secure links, man-in-the-middle attacks can be used to impersonate endpoints and thus still allow malicious activity to occur.

Digital security certificate systems have been developed to allow trusted third parties, namely certificate authorities, to issue digital certificates that authenticate encryption information for particular endpoints, such as for content provider endpoints. These digital certificates can be employed when an endpoint wishes to retrieve network content in a secure manner. The endpoint can use a certificate delivered with an encryption key associated with the content provider to establish that the content provider identity and associated link is authentic.

However, managing digital certificates can be cumbersome and slow, and is often a manual process. For example, a content administrator might have to manually request issuance of a digital certificate by entering data into a web form. Over time, this has driven acceptance of undesirable patterns and practices, increasing the risk of encryption key compromise and service outages. For example, the difficulty with acquiring certificates has led to the use of wildcard certificates and self-signed certificates.

Wildcard certificates can offer both convenience and cost reduction by reducing the total number of certificates managed within an environment. However, wildcard certificates increase breach scope as the compromise of one certificate may lead to the compromise of all services sharing the same domain. Wildcard certificates present a high lifecycle maintenance cost. If a wildcard certificate must be revoked, the number of services and components that must receive an update is often substantial. Wildcard certificates provide a lower level of assurance. As wildcard certificates remove a deployment barrier, they unintentionally encourage broader adoption and usage than was originally intended during issuance.

Self-signed certificates are commonly installed by applications and devices with the intent that they be temporary and replaced with trusted certificates. Remote desktop services and third-party management tools are common sources for self-signed certificates. Accessing services that offer self-signed certificates typically generate warnings regarding the lack of trust for the certificates. Users are typically instructed to ignore and click-through such warnings. These scenarios create fertile conditions for man-in-the-middle attacks.

OVERVIEW

Systems, apparatuses, services, platforms, and methods are discussed herein that provide digital security services and enhance digital security certificate issuance for communication systems. In one example, a digital security platform is presented that includes a client interface service configured to receive requests for digital security certificates from one or more requesting entities. The digital security platform includes a certificate service configured to process the requests against evaluation criteria to select certificate authorities to handle the requests, and handler processes configured to interface with associated ones of the selected certificate authorities for issuance and delivery of the digital security certificates.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
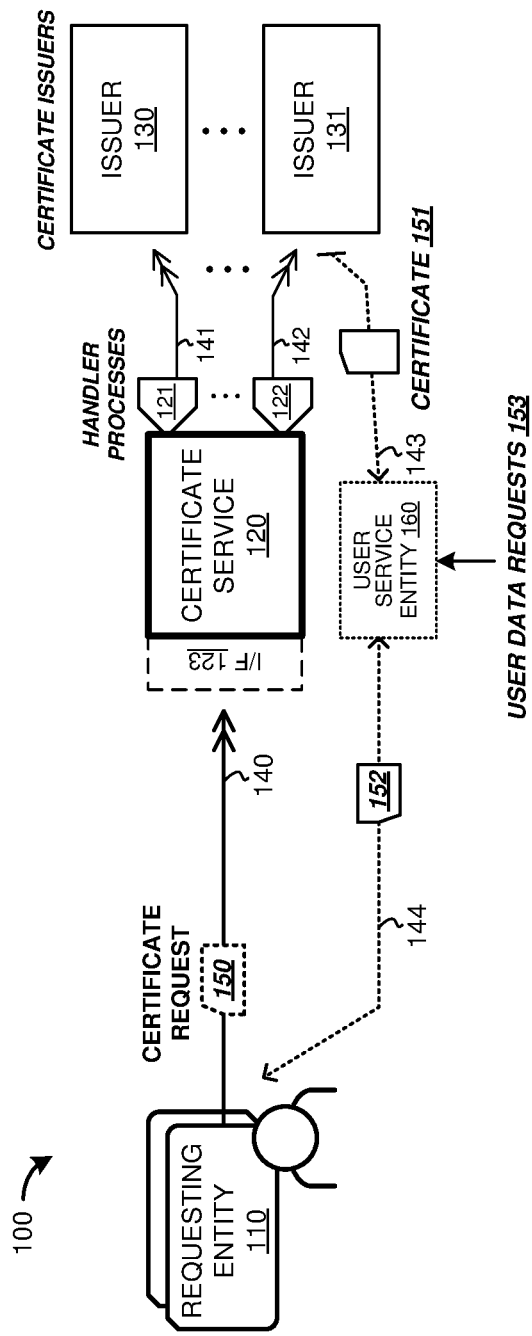
FIG. 1 is a diagram of a communication system in an implementation.

Digital security certificates are a frequent part of securing modern network communications, such as in public key infrastructure (PKI) techniques. Digital security certificate systems have been developed to allow trusted third parties, such as certificate authorities, to issue digital certificates that authenticate encryption information for content providers and other network endpoints. These digital certificates can be employed when a party wishes to retrieve network content in a secure manner. A digital certificate can be delivered with an encryption key associated with a content provider to establish authenticity of the content provider and associated communication links.

Traditional PKI implementations that provide digital certificates do not scale well to distributed computing and cloud services. For example, enterprise managed PKIs, such as the Enterprise Certificate Authority role available on Windows Server, can be difficult to manage securely and can require specialized hardware security modules (HSMs) to securely manage key material. These features can limit the scale and manageability of a given enterprise managed PKI, preventing the PKI from working effectively at large scales. Additional solutions are third-party providers such as Symantec, GlobalSign, Entrust, and others. These third-party PKI offerings can alleviate the need for dedicated hardware within an environment, but instead create a reliance on a single vendor and their software management stack. In many cases, users interact with these providers through web forms with manual data entry, or through application programming interfaces (APIs). However, third-party PKIs still act a single points of failure and cannot provide the performance and scale of the systems discussed herein.

In the examples herein, rather than a single monolithic service, a layer of abstraction is provided on top of many distributed and dissimilar PKI providers to achieve scale, availability, and risk mitigation. Discussed herein is certificate request platform than can intelligently route certificate requests, such as certificate signing requests (CSRs), to multiple PKI providers managed by multiple entities based on availability, load, region, cost, and specific requirements including domain names, different validations methods, and extensions.

When an entity desires to acquire a digital certificate, the entity typically must find a PKI that can issue the specific type of certificate that meets particular service needs of the entity. Not all issued certificates have the same features, such as differences in key usages and other extensions that are specific to a given service or application. A certificate might need a precise set of properties for it to work properly in a service. By defining a profile for the known capabilities of a given PKI provider, the examples herein can intelligently choose a PKI provider to issue a certificate by comparing certificate requests to these profiles. The platforms herein can also monitor the availability and current queue for a PKI provider to route requests to alternate equivalent PKI providers to distribute load and survive PKI provider outages or maintenance windows. With the PKI provider routing techniques discussed herein, requesting entities do not need to know specific details or special processes for a given PKI provider and can instead submit certificate requests to the certificate service which will select PKI providers that return the resulting certificates.

As a first example of enhanced digital certificate issuance and delivery, FIG. 1 provided. FIG. 1 is a diagram of communication system 100 in an implementation. Communication system 100 includes one or more requesting entities 110, security certificate service 120, certificate issuers 130-131, and user service entity 160. Certificate system 120 can include interface 123 and one or more handler processes 121-122. The elements of system 100 communicate over the various links shown in FIG. 1, such as links 140-144. A further discussion of the elements of FIG. 1 is included below following an operational description.

In operation, requesting entities 110 can issue requests for digital security certificates. Interface 123 of certificate service 120 receives these requests, and certificate service 120 processes the requests against one or more evaluation factors to select a certificate issue among certificate issuers 130-131. Handler processes 121-122 are employed to interface with certificate issuers 130-131, and can be spawned as-needed by certificate service 120 to handle certificate requests with associated certificate issuers. Certificate issuers 130-131 can issue digital certificates responsive to the requests of handler processes 121-122, such as certificate 151. Certificate issuers 130-131 each comprise certificate authorities that provide digital certificates in a PKI framework.

In many examples, the certificates are issued for use in data or content delivery over secure communication links. User data requests 153 can prompt transfer of the certificates, along with associated encrypted data, which can be handled by another entity, such as user service entity 160. For example, user service entity 160 might comprise a web server that establishes secure links for transfer of network data to users. The certificates, along with encrypted data, are transferred responsive to these user data requests. The encrypted data is typically encrypted with a private key of the content/data provider (such as a private key of entity 110), and provided along with the digital certificate that certifies the content/data provider is authentic.

The certificate requests issued by requesting entities includes various information related to a digital certificate desired by the requesting entity. For example, the requests can comprise certificate signing requests (CSRs) that might be included in the X.509 cryptography standard or other public key infrastructure (PKI) standards. The requests can include information related to the request, such as network/logical information (distinguished names (DN), domain names, and fully-qualified domain names (FQDNs)), business information (business names, organization names, and department names), geographic information (city designators/names, province/state names, and country names), or requesting party/personnel information (email addresses, and contact information), among other information.

Figure 2:
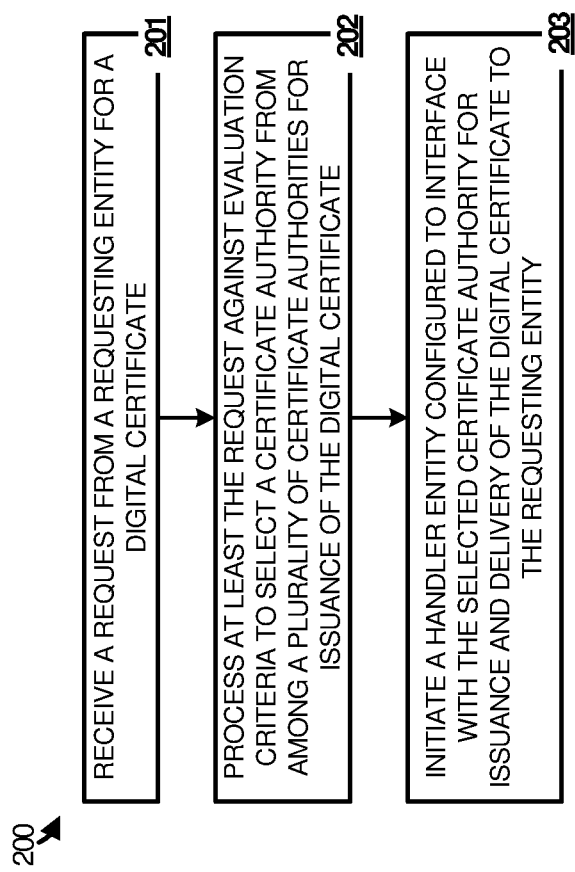
FIG. 2 illustrates operation of a security platform in an implementation.

To further illustrate operation of the elements of system 100, FIG. 2 is provided. FIG. 2 is a flow diagram illustrating example operations of certificate service 120. In FIG. 2, interface 123 receives (201) a request from a requesting entity for a digital certificate. In FIG. 1, this request can include certificate request 150, although other requests from any number of requesting entities can be received. Request 150 is issued over link 140 to be received by interface 123. Interface 123 can be included in elements of certificate service 120.

Interface 123 includes one or more user interfaces, such as web interfaces, APIs, terminal interfaces, console interfaces, command-line shell interfaces, extensible markup language (XML) interfaces, among others. In this example, interface 123 presents a standardized interface through which requesting entities can issue certificate requests. Typically, each certificate issuer or certificate authority will have specialized or custom ways to request certificates, which can include manual data entry via a web form or API-based interfaces. However, a requesting entity might normally have to issue a request custom-tailored to the particular nuances of a certificate issuer or certificate authority. There is not a common or consistent protocol or API in use across the CA industry. In the examples herein, a standardized or common CA-agnostic interface is presented by interface 123 for all certificate issuers or certificate authorities available by certificate service 120. For example, a web API can be provided by interface 123. The API provides consistency requesting entities across the many differences between CAs and associated interfaces. Advantageously, a requesting entity need only interface with a single common interface of certificate service 120 to access the certificates issued by any number of CAs or other entities. Thus, a layer of abstraction is provided by interface 123 and certificate service 120 for accessing the resources of many different CAs.

Certificate service 120 processes (202) at least the request against evaluation criteria to select a certificate authority from among a plurality of certificate authorities for issuance of the digital certificate. Certificate service 120 then initiates (203) a particular handler entity 121-122 configured to interface with the selected certificate authority for issuance and delivery of the digital certificate to the requesting entity. In FIG. 1, several certificate issuers 130-131 are shown. These certificate issuers can include certificate authority (CA) entities or portions thereof, and comprise trusted third-parties which issue digital certificates on behalf of requesting entities. Requesting entity 110 can issue a certificate request through standardized interface 123, and this certificate request can be serviced by any of the available certificate issuers or CAs. Certificate service 120 can act as an intelligent router of the certificate requests using handler processes 121-122.

Certificate service 120 selects among the certificate issuers and initiates associated handler processes using the evaluation criteria. Information included in the certificate request issued by requesting entity 110 can be processed against the evaluation criteria to identify or select a certificate issuer or handler process that is to service the certificate request. As mentioned above, the request can indicate information related to the request, such as network/logical information, business information, geographic information, or personnel information, among other information. The evaluation criteria can comprise one or more rules used to select a certificate issuer. These rules can include certificate type-based selections, domain-based selections, geographic/region-based selections, workload/load balancing selections, among other rules.

For example, certificate service 120 can select a certificate issuer based on regional/geographic rules, such as when a particular country handles certificate issuance for the country indicated in the certificate request. The country or region can be determined from a location indicated in the request or from a domain name associated with a particular country or political designation. Certificate service 120 can monitor a queue for each handler process 121-122 associated with the certificate issuers 130-131 to identify a present workload or loading of the handler processes, based in part on a number of items in the associated queue or a response time anticipated for each handler process. Certificate service 120 can dynamically respond to the availability or scalability of any given certificate authority or associated handler process. For example, if a CA is down for regular maintenance, associated or queued requests can be redirected to the queue of an equivalent handler process for another CA. In further examples, if a certificate request contains a particularly important domain or a sensitive network property, certificate service 120 can include additional levels of approval before processing the request for certificates.

The selected handler entity is configured to interface with the selected certificate authority for issuance and delivery of the digital certificate to the requesting entity. As each certificate authority or certificate issuer can have a unique or different interface for certificate requests, the selected handler entity can interwork the standardized requests received from requesting entities, such as request 150, to issue further associated requests to the selected certificate issuer. The requests transferred by the handler processes to the certificate issuers can be created by each associated handler process according to information included in the standardized request issued by the requesting entity as well as properties unique to the particular certificate issuer. Thus, a standardized request interface is presented by interface 123 and each handler process 121-122 can customize the standardized requests to each particular certificate issuer or CA. A requesting entity can thus request certificates that are serviced by any certificate issuer selected by certificate service 120 without having to structure the initial request to suit a custom interface of each of the certificate issuers.

Once the certificate is issued, such as certificate 151, then this certificate can be delivered to a storage device or storage system for later usage. In some examples, the certificate is transferred to the requesting entity, while in other examples the certificate is transferred to a storage system used to deploy content or data to users. For example, the certificate might be issued for a web site to establish a secure link for users, such as using secure sockets layer (SSL), Transport Layer Security (TLS), or Hypertext Transfer Protocol Secure (HTTPs), HTTP over SSL, or HTTP over TLS. When a user requests content of that website, then the certificate can be transferred to establish a secure link and authenticate the source of the content or data by way of the trusted third-party certificate issuer. In FIG. 1, an example user request 153 is shown for data that is stored or served by user service entity 160, such as when user service entity is a web server.

Turning now to a discussion of the elements of FIG. 1, requesting entity 110 comprises any number of end user systems, such as terminals, computing devices, tablet devices, servers, cloud-based systems, distributed computing platforms, and the like. Users, such as administrators or other personnel, can issue certificate requests as requesting entity 110. Requesting entity 110 includes one or more network interfaces, such as network interface cards, wireless interfaces, optical networking interfaces, and the like, over which certificate requests can be issued. Requesting entity 110 can include hardware and software elements to interface with a certificate platform using web interfaces, terminal interfaces, console interfaces, shell interfaces, APIs, graphical user interface, textual user interface, among other user interfaces, including combinations thereof.

Security certificate service 120 can include communication interfaces, network interfaces, processing systems, computer systems, microprocessors, storage systems, storage media, or some other processing devices or software systems, and can be distributed among multiple devices or across multiple geographic locations. Examples of security certificate service 120 can include software such as an operating system, logs, databases, utilities, drivers, networking software, and other software stored on a computer-readable medium. Security certificate service 120 can comprise one or more platforms which are hosted by a distributed computing system or cloud-computing service. Security certificate service 120 can comprise logical interface elements, such as software defined interfaces and Application Programming Interfaces (APIs).

Security certificate service 120 includes interface 123 and handler processes 120-121, among other elements. Interface 123 can include one or more user interfaces, such as web interfaces, APIs, terminal interfaces, console interfaces, command-line shell interfaces, extensible markup language (XML) interfaces, among others. Handler processes 120-121 each comprise communication interfaces to communicate with certificate issuers 130-131, which can include communication equipment or software that is specialized for particular ones of the certificate issuers. In some examples, handler processes 120-121 each comprise distributed computing elements that are initiated or spawned on-demand to service certificate requests. Once certificate service 120 selects a particular certificate issuer, a handler process can be initiated to interface with the selected certificate issuer.

User service entity 160 might comprise a web server, email server, or distributed computing platform which provides data or communication services. User service entity 160 can store content or data for delivery to user devices, which can include digital certificates delivered to user devices for establishing secure links with the user devices. In some examples, user service entity 160 comprises a security server or security service which establishes an encrypted link between a user and a content service, such as an email service or web service.

Links 140-144 can each comprise one or more communication links, such as one or more network links comprising wireless or wired network links. Links 140-144 can comprise various logical, physical, or application programming interfaces. Example communication links can use metal, glass, optical, air, space, or some other material as the transport media. Links 140-144 can use various communication protocols, such as Internet Protocol (IP), Ethernet, hybrid fiber-coax (HFC), synchronous optical networking (SONET), asynchronous transfer mode (ATM), Time Division Multiplex (TDM), circuit-switched, communication signaling, wireless communications, or some other communication format, including combinations, improvements, or variations thereof. Links 140-144 can be direct links or may include intermediate networks, systems, or devices, and can include a logical network link transported over multiple physical links.

Figure 3:
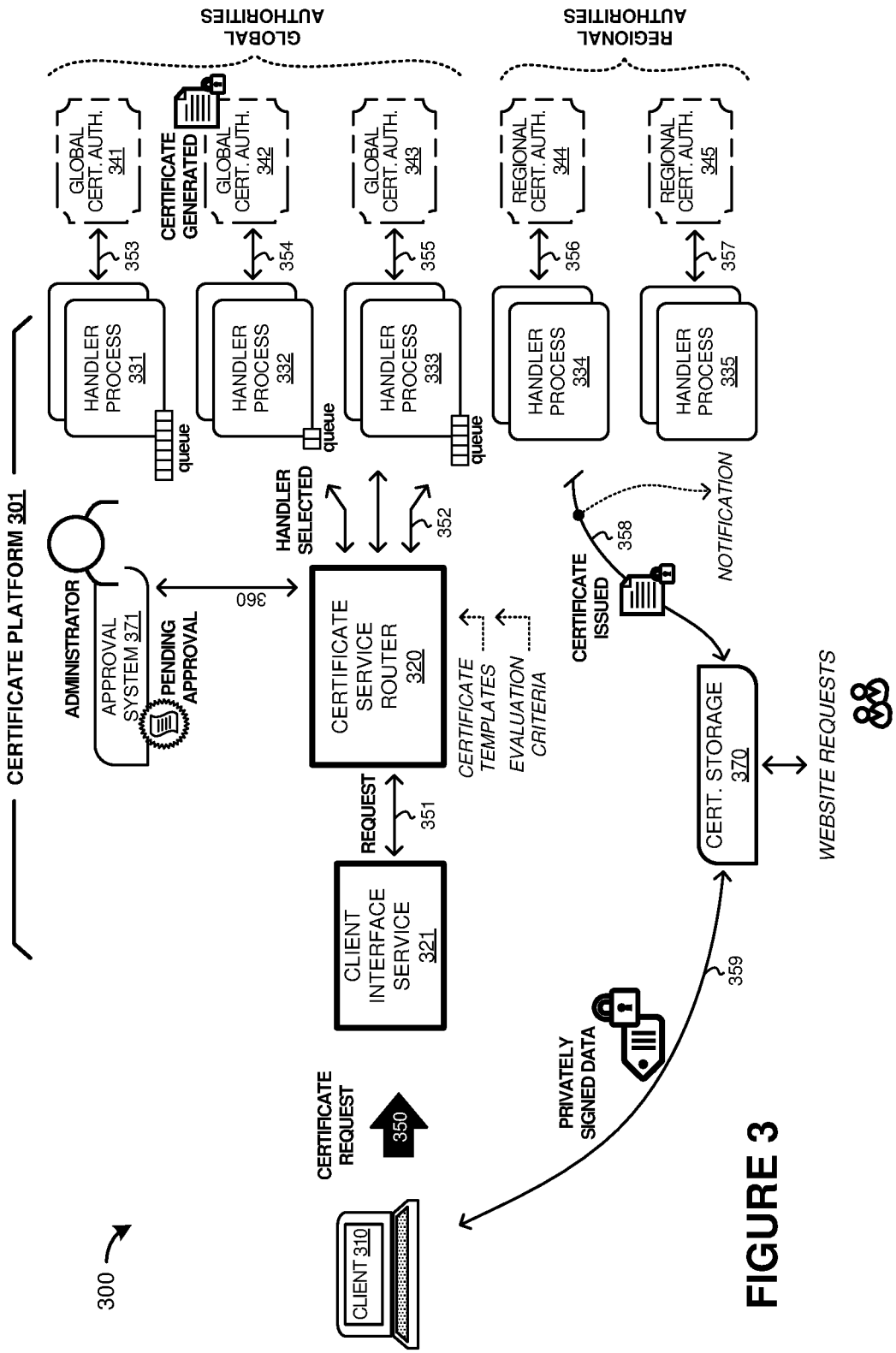
FIG. 3 is a diagram of a communication system in an implementation.

As a further example of systems and platforms that provide enhanced security certificate services, FIG. 3 is provided. FIG. 3 is a system diagram that includes system 300. System 300 includes client 310, client interface service 321, certificate service router 320, handler processes 331-335, certificate authorities (CAs) 341-345, certificate storage element 370, and approval system 371. Elements of system 300, such as elements 320, 321, 331-335, 370-371, can be included in certificate platform 301. Elements of certificate platform 301 can comprise various distributed computing elements, systems, and platforms, such as cloud computing service platforms distributed over a logical or geographic area. Elements in FIG. 3 are communicatively coupled using one or more physical or logical communication links 350-360. These links can include networking links discussed above for links 140-144 in FIG. 1, or can include logical links or API links, among others.

Figure 4:
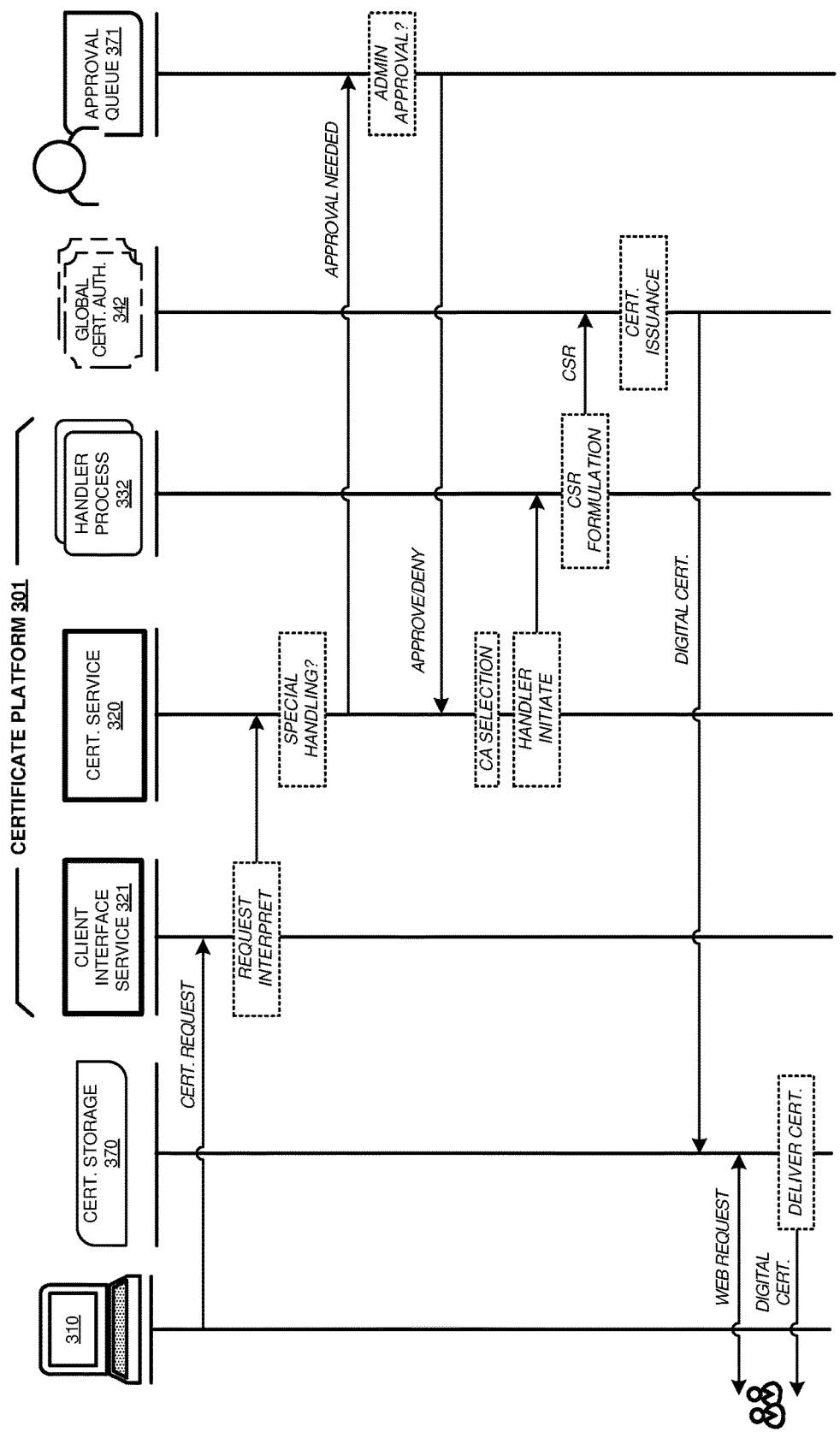
FIG. 4 illustrates operation of a security platform in an implementation.

Example operation of the elements of FIG. 3 is provided in FIG. 4. In operation, client 310 (among other clients) can issue certificate requests through client interface service 321. Client interface service 321 comprises a standardized web API in this example through which clients can issue certificate requests for any CA serviced by certificate platform 301 with a uniform request interface, such as an XML-based interface that can receive the requests with associated information provided in the request. Certificate service 320 or client interface 321 can interpret the request to extract information used in selecting a CA to handle the certificate request.

Various certificates issued by the CAs can be of different types and for different purposes or uses. Encryption key usages and other extensions can be specific to a given service or application. These are defined in certificate templates employed by certificate service router 320 that determine the key usage, extensions, subject name, validity period, and other properties of a certificate and the certificate request. A certificate might need a precise set of these properties for it to work properly in a service. By defining a profile for the known capabilities of each CA in FIG. 3, certificate service router 320 can intelligently choose a CA to issue a certificate by comparing the request to this profile along with other rules/factors. The availability and current queue for a CA can be monitored to route requests to alternate equivalent CAs to distribute load and survive CA outages or maintenance windows. Advantageously, certificate service router 320 allows a client to be agnostic to custom details or special processes for a given CA and can instead submit a standardized certificate request to certificate platform 301 which will intelligently choose a CA for fulfilling the resulting certificate.

Information provided in the request and the associated certificate templates can be evaluated against one or more evaluation criteria or processing rules. The certificate request can indicate information related to the request, such as network/logical information, business information, geographic information, or personnel information, among other information. The evaluation criteria can comprise one or more rules used to select a CA. These rules can include certificate type-based selections, domain-based selections, geographic/region-based selections, workload/load balancing selections, among other rules. In FIG. 3, platform 301 provides one or more handler processes each associated with one or more CAs. The handler processes are specialized according to interfaces employed by the designated CAs. Since each CA can have an associated request interface custom to that CA or different from other CAs, each handler process can be specialized accordingly to interface with the associated CA.

For example, certificate service 320 can select a certificate issuer based on regional/geographic rules, such as when a particular country handles certificate issuance for the country indicated in the certificate request. The country or region can be determined from a location indicated in the request or from a domain name associated with a particular country or political designation. In FIG. 3, two regional CAs are shown, namely CAs 344-345. Each of CA 344-345 can be associated with a particular region or country, such as Germany and China, respectively. Certificate requests originating or referencing these countries or regions can be routed to the CAs for the particular country or region for handling. It should be noted that even when a particular or single CA is associated with a region or country, platform 301 can still provide many instances of handler processes which can issue certificate requests to those CAs, providing for workload balancing and standardized interfaces to clients.

However, typical certificate requests will be issued by clients for handling by any CA, with time or latency being the most important factor for the client. Thus, platform 301 can select among the various global or regional CAs which can service the certificate request in the most efficient or fastest manner. To provide for this rapid response, certificate service 320 can monitor a queue for each handler process 331-335 (or issuance queues associated with the actual CAs) to identify a present workload or loading of the handler processes, based in part on a number of items in the associated queue or a response time anticipated for each handler process. Certificate service 320 can dynamically respond to the availability or scalability of any given certificate authority or associated handler process. For example, if a CA is down for regular maintenance, associated or queued requests can be redirected to the queue of an equivalent handler process for another CA.

In another example, a certificate request might be issued by client 310 for a particular type of service, such as HTTPS or a secure email link. These might be handled by one or more specific CAs, and certificate requests can be routed for handling accordingly. In further examples, if a certificate request contains a particularly important domain or a sensitive network property, certificate service 320 can include additional levels of approval or auditing before processing the request for certificates. This additional approval is shown in FIG. 3 for approval system 371. Approval system 371 can receive notification of a certificate request for a particular domain or network property, certificate service router 320 can seek approval or authorization from an administrator associated with system 371 before proceeding with further processing of the certificate request. If the certificate request is determined to not be authorized, such as due to a malicious certificate request or an unintentional certificate request, then approval system 371 can prevent further processing of the associated certificate request before a certificate is actually issued. A denial message can be transferred to the requesting client or to a monitoring system. If the certificate request is determined to be authorized, then further processing and certificate issuance can proceed. In a specific example, certificate service router 320 submits each certificate request for approval, and once approved, evaluates the certificate and routes it to a handler process. The handler process receives the certificate requests and submits the appropriate CA to be fulfilled.

In some examples, the initial certificate request issued by client 310 is processed and a new certificate request for a particular CA is issued based on the initial request. The initial request can be parsed to extract relevant information which is encapsulated and reformatted into a request customized to the CA selected by certificate service 320. This process can include CSR formulation based on the initial request so that the client can interface with platform 301 in a CA-agnostic manner, while each handler process can issue a certificate request customized to the associated CA.

Once the CA receives the certificate request from the associated handler process, the CA can fulfil the request by issuing a digital security certificate. This certificate can be transferred for delivery to the original requesting client or to another entity for storage and later use in establishing secure links with users. For example, users might browse various websites associated with the certificate and secure browsing sessions can be established using the certificate. The certificate might be stored by certificate storage system 370, which might comprise a web server or email server, and the certificates provided on-demand to users. Additionally, the data or content requested by the users can be encrypted using a private encryption key of a content provider. In FIG. 3, privately signed data is provided by client 310 for storage and delivery by certificate storage 370. The certificate can be provided with the privately signed data. Users can verify that the privately signed data originated from an authenticated party using the certificate which can include a public key of the authenticated party. Since the CA is a trusted third-party, the user can be assured that a man-in-the-middle attack is unlikely and content or data received by the user is legitimate.

Figure 5:
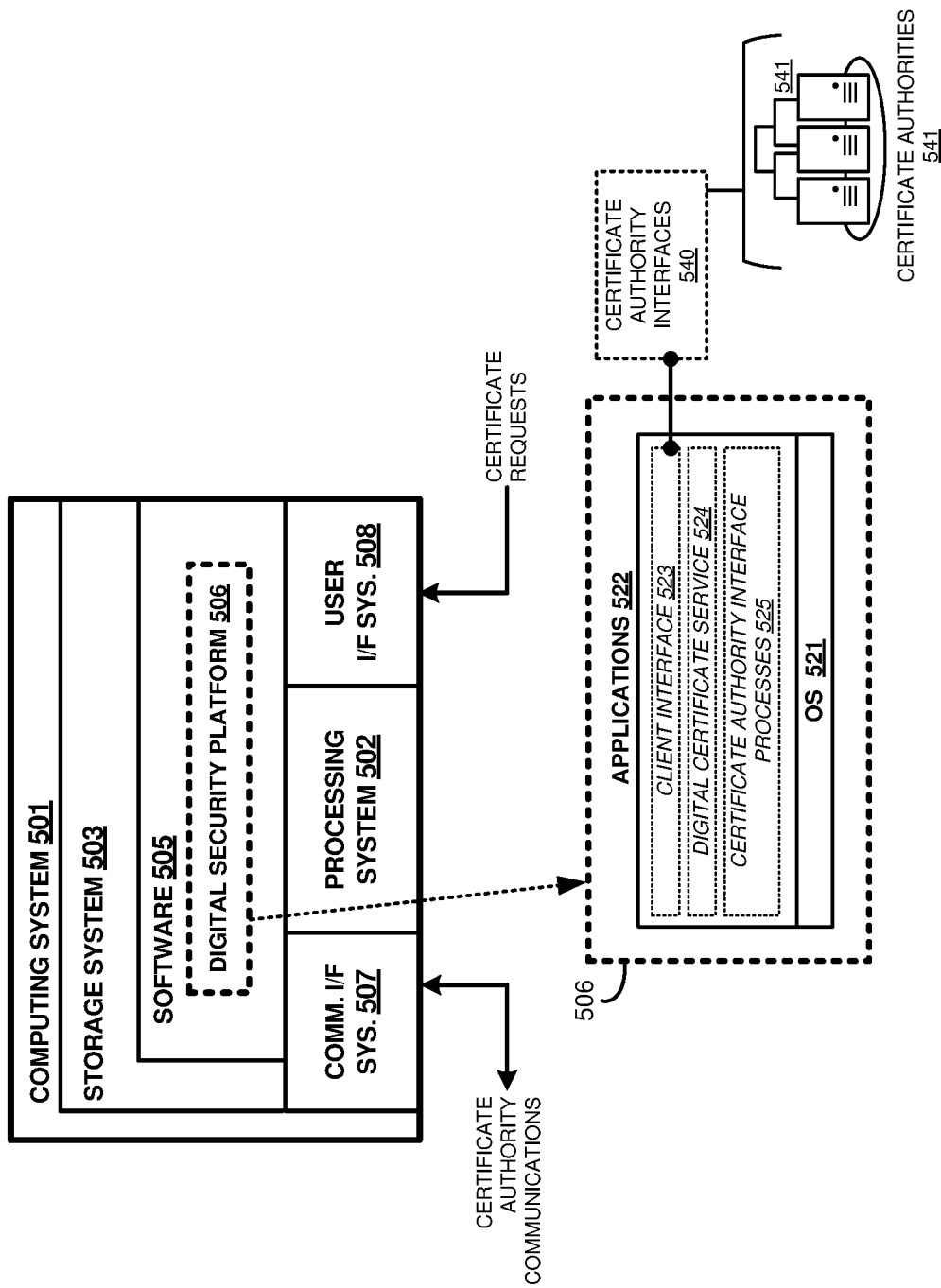
FIG. 5 illustrates an example computing platform for implementing any of the platforms, architectures, processes, methods, and operational scenarios disclosed herein.

FIG. 5 illustrates computing system 501 that is representative of any system or collection of systems in which the various operational architectures, scenarios, and processes disclosed herein may be implemented. For example, computing system 501 can be used to implement any of the elements of FIG. 1, such as security certificate service 120, and certificate platform 301 of FIG. 3.

Examples implemented by computing system 501 include, but are not limited to, server computers, cloud computing systems, distributed computing systems, software-defined networking systems, computers, desktop computers, hybrid computers, rack servers, web servers, cloud computing platforms, and data center equipment, as well as any other type of physical or virtual server machine, and other computing systems and devices, as well as any variation or combination thereof.

Computing system 501 may be implemented as a single apparatus, system, or device or may be implemented in a distributed manner as multiple apparatuses, systems, or devices. Computing system 501 includes, but is not limited to, processing system 502, storage system 503, software 505, communication interface system 507, and user interface system 508. Processing system 502 is operatively coupled with storage system 503, communication interface system 507, and user interface system 508.

Processing system 502 loads and executes software 505 from storage system 503. Software 505 includes digital security platform 506, which is representative of the processes, services, and platforms discussed with respect to the preceding Figures.

When executed by processing system 502 to provide enhanced digital certificate issuance and delivery, among other services, software 505 directs processing system 502 to operate as described herein for at least the various processes, operational scenarios, and sequences discussed in the foregoing implementations. Computing system 501 may optionally include additional devices, features, or functionality not discussed for purposes of brevity.

Referring still to FIG. 5, processing system 502 may comprise a microprocessor and processing circuitry that retrieves and executes software 505 from storage system 503. Processing system 502 may be implemented within a single processing device, but may also be distributed across multiple processing devices or sub-systems that cooperate in executing program instructions. Examples of processing system 502 include general purpose central processing units, application specific processors, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device, but may also be implemented across multiple storage devices or sub-systems co-located or distributed relative to each other. Storage system 503 may comprise additional elements, such as a controller, capable of communicating with processing system 502 or possibly other systems.

Software 505 may be implemented in program instructions and among other functions may, when executed by processing system 502, direct processing system 502 to operate as described with respect to the various operational scenarios, sequences, and processes illustrated herein. For example, software 505 may include program instructions for implementing enhanced digital certificate issuance and delivery services, among other services.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software or other application software, in addition to or that include digital security platform 506. Software 505 may also comprise firmware or some other form of machine-readable processing instructions executable by processing system 502.

In general, software 505 may, when loaded into processing system 502 and executed, transform a suitable apparatus, system, or device (of which computing system 501 is representative) overall from a general-purpose computing system into a special-purpose computing system customized to provide enhanced digital certificate issuance and delivery services, among other services. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary storage, as well as other factors.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Digital security platform 506 includes one or more software elements, such as OS 521 and applications 522. Applications 522 can include client interface 523, digital certificate service 524, and certificate authority interface processes 525, or other services which can provide enhanced digital security and certificate services. Applications 522 can receive user input, such as certificate requests from users or administrators, through user interface system 508. Client interface 523 provides one or more user interfaces to users or administrators for receiving requests for digital certificates as well as alerting issuance and delivery of the digital certificates to the requesting parties. Client interface 523 includes a client interface service configured to receive requests for digital security certificates from one or more requesting entities. Digital certificate service 524 processes the requests against evaluation criteria to select certificate authorities to handle the requests. Certificate authority interface processes 525 interface with associated ones of the selected certificate authorities 541 over interfaces 540 for issuance and delivery of the digital security certificates.

Communication interface system 507 may include communication connections and devices that allow for communication with other computing systems (not shown) over communication networks (not shown), or with certificate authorities 541. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media.

User interface system 508 can receive input and provide output over a network interface, such as communication interface system 507. In network examples, user interface system 508 might include web interfaces and terminal interfaces. User interface system 508 can packetize display or graphics data for remote display by a display system or computing system coupled over one or more network interfaces or web interfaces. Physical or logical elements of user interface system 508 can provide alerts or visual outputs to users or other operators. User interface system 508 may also include associated user interface software executable by processing system 502 in support of the various user input and output devices discussed above. Separately or in conjunction with each other and other hardware and software elements, the user interface software and user interface devices may support a graphical user interface, a natural user interface, or any other type of user interface. In further examples, user interface system 508 may include a touchscreen, keyboard, mouse, voice input device, audio input device, or other touch input device for receiving input from a user. Output devices such as a display, speakers, web interfaces, terminal interfaces, and other types of output devices may also be included in user interface system 508.

Communication between computing system 501 and other computing systems, may occur over a communication network or networks and in accordance with various communication protocols, combinations of protocols, or variations thereof. For example, computing system 501 might communicate with certificate authorities 541 over one or more network interfaces comprising certificate authority interfaces 540. Examples network include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transmission control protocol (TCP), and the user datagram protocol (UDP), as well as any other suitable communication protocol, variation, or combination thereof.

Certain inventive aspects may be appreciated from the foregoing disclosure, of which the following are various examples.

Example 1

A computing apparatus comprising one or more computer readable storage media, a processing system operatively coupled with the one or more computer readable storage media, and a digital security service comprising program instructions stored on the one or more computer readable storage media. When read and executed by the processing system, the program instructions direct the processing system to at least receive a request from a requesting entity for a digital certificate, process at least the request against evaluation criteria to select a certificate authority from among a plurality of certificate authorities for issuance of the digital certificate, and initiate a handler entity configured to interface with the selected certificate authority for issuance and delivery of the digital certificate.

Example 2

The computing apparatus of Example 1, wherein the program instructions further direct the processing system to present a certificate authority-agnostic request interface to requesting entities for initiating certificate requests to any of the plurality of certificate authorities.

Example 3

The computing apparatus of Examples 1-2, wherein the program instructions further direct the processing system to establish a plurality of handler entities, each designated to interface with at least one of the plurality of certificate authorities to request issuance of associated digital certificates, wherein each of the plurality of handler entities are specialized according to interfaces employed by designated ones of the plurality of certificate authorities.

Example 4

The computing apparatus of Examples 1-3, wherein the program instructions further direct the processing system to select the handler entity from among the plurality of handler entities based on the evaluation criteria and a workload status of the plurality of handler entities.

Example 5

The computing apparatus of Examples 1-4, wherein the handler entity is customized to communicate with the selected certificate authority using an interface associated with the selected certificate authority.

Example 6

The computing apparatus of Examples 1-5, wherein the program instructions further direct the processing system to process information included in the request to determine the selected certificate authority to handle the request from among the plurality of certificate authorities based on one or more of the evaluation criteria comprising a domain name associated with the request, a geographic region associated with the request, workload status of the handler entity, and properties of the plurality of certificate authorities.

Example 7

The computing apparatus of Examples 1-6, wherein the program instructions further direct the processing system to process at least the request to identify a domain associated with the request. Based on the domain, the program instructions further direct the processing system to perform a request audit process to establish the request as a valid request. Responsive to the request being a valid request, the program instructions further direct the processing system to initiate the handler entity for issuance and delivery of the digital certificate.

Example 8

The computing apparatus of Examples 1-7, wherein the program instructions further direct the processing system to establish a plurality of handler entities, each designated to interface with at least one of the plurality of certificate authorities to request issuance of associated digital certificates, wherein ones of the plurality of handler entities are specialized according to geographic regions of associated ones of the certificate authorities, and select the handler entity from among the plurality of handler entities based on the evaluation criteria comprising a geographic region indicated by the request.

Example 9

A method of operating a digital security service. The method includes receiving a request from a requesting entity for a digital certificate, processing at least the request against evaluation criteria to select a certificate authority from among a plurality of certificate authorities for issuance of the digital certificate, and initiating a handler entity configured to interface with the selected certificate authority for issuance and delivery of the digital certificate.

Example 10

The method of Example 9, further comprising presenting a certificate authority-agnostic request interface to requesting entities for initiating certificate requests to any of the plurality of certificate authorities.

Example 11

The method of Examples 9-10, further comprising establishing a plurality of handler entities, each designated to interface with at least one of the plurality of certificate authorities to request issuance of associated digital certificates, wherein each of the plurality of handler entities are specialized according to interfaces employed by designated ones of the plurality of certificate authorities.

Example 12

The method of Examples 9-11, further comprising selecting the handler entity from among the plurality of handler entities based on the evaluation criteria and a workload status of the plurality of handler entities.

Example 13

The method of Examples 9-12, wherein the handler entity is customized to communicate with the selected certificate authority using an interface associated with the selected certificate authority.

Example 14

The method of Examples 9-13, further comprising processing information included in the request to determine the selected certificate authority to handle the request from among the plurality of certificate authorities based on one or more of the evaluation criteria comprising a domain name associated with the request, a geographic region associated with the request, workload status of the handler entity, and properties of the plurality of certificate authorities.

Example 15

The method of Examples 9-14, further comprising processing at least the request to identify a domain associated with the request, and based on the domain, performing a request audit process to establish the request as a valid request. The method includes, responsive to the request being a valid request, initiating the handler entity for issuance and delivery of the digital certificate.

Example 16

The method of Examples 9-15, further comprising establishing a plurality of handler entities, each designated to interface with at least one of the plurality of certificate authorities to request issuance of associated digital certificates, wherein ones of the plurality of handler entities are specialized according to geographic regions of associated ones of the certificate authorities, and selecting the handler entity from among the plurality of handler entities based on the evaluation criteria comprising a geographic region indicated by the request.

Example 17

A digital security platform, comprising a client interface service configured to receive requests for digital security certificates from one or more requesting entities, a certificate service configured to process the requests against evaluation criteria to select certificate authorities to handle the requests, and handler processes configured to interface with associated ones of the selected certificate authorities for issuance and delivery of the digital security certificates.

Example 18

The digital security platform of Example 17, comprising the client interface service configured to present a certificate authority-agnostic request interface to the requesting entities for initiating the requests serviced by any of the certificate authorities, and the handler processes configured to communicate with the associated ones of the selected certificate authorities using interfaces specialized to the associated ones of the selected certificate authorities.

Example 19

The digital security platform of Examples 17-18, comprising the certificate service configured to process information included in the requests to determine the selected certificate authorities to handle the requests from among the certificate authorities based on one or more of the evaluation criteria comprising domain names associated with the requests, geographic region associated with the requests, workload status of the handler processes, and properties of the certificate authorities.

Example 20

The digital security platform of Examples 17-19, comprising the certificate service configured to process the requests to identify domains associated with the requests. Based on the domains, the certificate service is configured to perform request audit processes to establish the requests as approved requests. Responsive to ones of the requests being valid requests, the certificate service is configured to initiate the handler processes for issuance and delivery of the digital security certificates.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A computing apparatus comprising:
    one or more non-transitory computer readable storage media;
    a processing system operatively coupled with the one or more non-transitory computer readable storage media and;
    a digital security service comprising program instructions stored on the one or more non-transitory computer readable storage media that, when read and executed by the processing system, direct the processing system to at least:
    establish a plurality of handler entities, each individually configured to interface with at least one of a plurality of certificate authorities to request issuance of associated digital certificates;
    present a standardized interface for requesting entities to issue requests for digital certificates, wherein the requests comprise certificate authority-agnostic requests;
    receive a request from a requesting entity for a digital certificate, wherein the request originates from the requesting entity as a certificate authority-agnostic request;
    process at least the request to identify a domain associated with the request;
    based on the domain, perform a request audit process to establish the request as a valid request;
    process at least the request against evaluation criteria to select a certificate authority from among the plurality of certificate authorities for issuance of the digital certificate; and
    responsive to the request being a valid request, initiate a selected handler entity on behalf of the requesting entity to compose a certificate signing request (CSR) customized to the selected certificate authority, and interface with the selected certificate authority using the CSR instead of the certificate authority-agnostic request for issuance and delivery of the digital certificate.

2. The computing apparatus of claim 1, wherein the program instructions further direct the processing system to:
    present a certificate authority-agnostic request interface as the standardized interface to requesting entities for initiating certificate requests to any of the plurality of certificate authorities.

3. The computing apparatus of claim 1, wherein each of the plurality of handler entities are specialized according to interfaces employed by designated ones of the plurality of certificate authorities.

4. The computing apparatus of claim 3, wherein the program instructions further direct the processing system to:
 determine the selected handler entity from among the plurality of handler entities based on the evaluation criteria and a workload status of the plurality of handler entities.

5. The computing apparatus of claim 1, wherein the selected handler entity is customized to communicate with the selected certificate authority using an interface associated with the selected certificate authority.

6. The computing apparatus of claim 1, wherein the program instructions further direct the processing system to:
 process information included in the request to determine the selected certificate authority to handle the request from among the plurality of certificate authorities based on one or more of the evaluation criteria comprising a domain name associated with the request, a geographic region associated with the request, workload status of the selected handler entity, and properties of the plurality of certificate authorities.

7. The computing apparatus of claim 1, wherein the program instructions further direct the processing system to:
 wherein ones of the plurality of handler entities are specialized according to geographic regions of associated ones of the certificate authorities; and
 determine the selected handler entity from among the plurality of handler entities based on the evaluation criteria comprising a geographic region indicated by the request.

8. A method of operating a digital security service, the method comprising:
 establishing a plurality of handler entities, each individually configured to interface with at least one of a plurality of certificate authorities to request issuance of associated digital certificates;
 presenting a standardized interface for requesting entities to issue requests for digital certificates, wherein the requests comprise certificate authority-agnostic requests;
 receiving a request from a requesting entity for a digital certificate, wherein the request originates from the requesting entity as a certificate authority-agnostic request;
 processing at least the request to identify a domain associated with the request;
 processing at least the request against evaluation criteria to select a certificate authority from among the plurality of certificate authorities for issuance of the digital certificate;
 based on the domain, performing an audit process to establish the request as a valid request; and
 responsive to the request being a valid request, initiating a selected handler entity on behalf of the requesting entity to compose a certificate signing request (CSR) customized to the selected certificate authority, and interface with the selected certificate authority using the CSR instead of the certificate authority-agnostic request for issuance and delivery of the digital certificate.

9. The method of claim 8, further comprising:
 presenting a certificate authority-agnostic request interface as the standardized interface to requesting entities for initiating certificate requests to any of the plurality of certificate authorities.

10. The method of claim 8, wherein each of the plurality of handler entities are specialized according to interfaces employed by designated ones of the plurality of certificate authorities.

11. The method of claim 10, further comprising:
 determining the selected handler entity from among the plurality of handler entities based on the evaluation criteria and a workload status of the plurality of handler entities.

12. The method of claim 8, wherein the selected handler entity is customized to communicate with the selected certificate authority using an interface associated with the selected certificate authority.

13. The method of claim 8, further comprising:
 processing information included in the request to determine the selected certificate authority to handle the request from among the plurality of certificate authorities based on one or more of the evaluation criteria comprising a domain name associated with the request, a geographic region associated with the request, workload status of the selected handler entity, and properties of the plurality of certificate authorities.

14. The method of claim 8, further comprising:
 wherein ones of the plurality of handler entities are specialized according to geographic regions of associated ones of the certificate authorities; and
 determining the selected handler entity from among the plurality of handler entities based on the evaluation criteria comprising a geographic region indicated by the request.

15. A digital security system, comprising:
 a client interface service configured to present a standardized interface for requesting entities to initiate requests for digital security certificates;
 the client interface service configured to receive the requests for digital security certificates issued by the requesting entities, wherein the requests originate from the requesting entities as certificate authority-agnostic requests;
 a certificate service comprising at least one microprocessor configured to process the requests to identify domains associated with the requests and process the requests against evaluation criteria to select certificate authorities to handle the requests;
 based on the domains, the certificate service configured to perform audit processes to establish the requests as approved requests; and
 responsive to ones of the requests being valid requests, the certificate service configured to initiate selected handler processes configured to compose certificate signing requests (CSRs) customized to the ones of the selected certificate authorities and interface with the associated ones of the selected certificate authorities using the CSRs instead of the certificate authority-agnostic requests for issuance and delivery of the digital security certificates.

16. The digital security system of claim 15, comprising:
 the client interface service configured to present a certificate authority-agnostic request interface as the standardized interface to the requesting entities for initiating the requests serviced by any of the certificate authorities;

the selected handler processes configured to communicate with the associated ones of the selected certificate authorities using interfaces specialized to the associated ones of the selected certificate authorities.

17. The digital security platform system of claim 15, comprising:
the certificate service configured to process information included in the requests to determine the selected certificate authorities to handle the requests from among the certificate authorities based on one or more of the evaluation criteria comprising domain names associated with the requests, geographic region associated with the requests, workload status of the selected handler processes, and properties of the certificate authorities.

* * * * *